United States Patent Office 3,501,416
Patented Mar. 17, 1970

3,501,416
LOW-MELTING CATALYST
Milton M. Wald, Walnut Creek, Calif., assignor to Shell Oil Company, New York, N.Y., a corporation of Delaware
No Drawing. Filed Mar. 17, 1966, Ser. No. 535,018
Int. Cl. C07c 5/24, 5/28
U.S. Cl. 252—429         2 Claims

ABSTRACT OF THE DISCLOSURE

A low-melting Friedel-Crafts catalyst having the composition
(1) 5–50% wt. aluminum chloride,
(2) 0–70% wt. antimony chloride, and
(3) either
   (A) 5–80% wt. of a $C_4$–$C_{20}$ quaternary ammonium tetrachloroaluminate, or
   (B) at least 2% wt. of each of at least two alkali metal tetrachloroaluminates and 1–50% wt. of at least one of the group consisting of zinc, calcium, and barium tetrachloroaluminates.

---

This invention relates to novel, low-melting salt mixtures useful as Friedel-Crafts catalysts for hydrocarbon conversion processes. In particular, it relates to low-melting mixtures of aluminum chloride with other organic and inorganic salts.

Aluminum chloride has been used as a hydrocarbon conversion catalyst for many years. It is a relatively low-melting (194° C.), low-boiling (sublimes 178° C.) solid which is only slightly soluble in saturated hydrocarbons. It has been used as catalyst as a solid and also in the liquid and vapor phases, though it has not been successfully mounted on a catalyst support as it has a great tendency to wash off if not bonded to the support and becomes rapidly deactivated if it is bonded. Various difficulties also arise from using slurried aluminum chloride solid since it tends to distribute itself as a powder throughout the reactor and separation apparatus, due to its solubility in hydrocarbons and great tendency to sublime.

Many of the difficulties caused by the use of solid aluminum chloride can be overcome by confining the aluminum chloride to a solvent. While aluminum chloride is indeed soluble in a large number of organic solvents, it usually dissolves with the formation of a complex and thereby loses a large portion of its activity. Generally, the deactivation caused by complex formation is sufficient to lower its activity below that needed for reaction of paraffinic hydrocarbons. One solvent in which aluminum chloride dissolves without losing catalytic activity is antimony trichloride; these mixtures have been used commercially for many years for isomerization of low-molecular-weight paraffins. This system, however, has a major disadvantage in that its melting point is about 70° C., limiting operating temperatures to above about 70° C. Until the present time, the many advantages of operating certain aluminum chloride processes, including paraffin isomerization, at lower temperatures could not be realized.

Liquid catalysts are desirable since they are generally easier to handle and afford better contacting than solid catalysts. A practical liquid catalyst should have two essential characteristics: firstly, it should have a high catalytic activity, and secondly, it should be low melting, i.e., below 60° C. and preferably below 50° C. In addition it would be desired if the catalyst was also regenerable, since aluminum chloride catalyzed processes frequently produce sludge-like materials which deactivate the catalyst and are expensive to discard. An example of a practical regeneration process for aluminum chloride sludge is described in Ross, U.S. 3,227,776, issued Jan. 4, 1966. According to this process, sludge is hydrocracked at high temperatures in the presence of antimony chloride to yield fresh aluminum chloride, which may be recycled to a hydrocarbon conversion process. Prior to the present invention, low-melting active aluminum chloride catalysts have not been available in the art.

It has now been discovered that certain aluminum chloride based salts having low melting points and high activities comprise a mixture of from 5–50% wt. aluminum chloride, 0–70% wt. antimony trichloride, and either (a) 5–80% wt. of a $C_4$–$C_{20}$ quaternary ammonium tetrachloroaluminate or (b) at least 2% wt. of each of at least two alkali metal tetrachloroaluminates, totaling 4–60% wt. and 1–50% wt. of at least one of the group of zinc, calcium and barium tetrachloroaluminates.

ORGANIC SALT MIXTURES

The organic salt mixtures of the invention comprise 5–50% wt. aluminum chloride, 0–70% wt. antimony chloride, and 5–80% wt., preferably 25–70% wt. of a $C_4$–$C_{20}$ quaternary ammonium tetrachloroaluminate. Free aluminum chloride content is generally at least 5% wt., preferably at least 8%, in order to impart sufficient activity to the catalyst. Depending on the activity desired, it may be present up to limits of solubility, or in some cases, a small amount of solid may be present. The organic tetrachloroaluminates have at least 4 carbons but not more than 20 carbons, preferably not more than 10 carbons, since more carbons do not appreciably enhance the properties of the mixture, and may degrade the catalyst.

The tetrachloroaluminates may be simply prepared by the addition of stoichiometric amounts of the appropriate ammonium chloride salt and aluminum chloride. These mixtures have the advantage of being extremely low melting, some melting below 0° C. Examples of suitable tetrachloroaluminates are tetramethylammonium tetrachloroaluminate, tetraethylammonium tetrachloroaluminate, trimethylethylammonium tetrachloroaluminate, dimethyldiethyl tetrachloroaluminate, tetrapropylammonium tetrachloroaluminate, tetrabutylammonium tetrachloroaluminate, diethyldipropylammonium tetrachloroaluminate, tripropylbutylammonium tetrachloroaluminate, diethyldibutylammonium tetrachloroaluminate, dimethyldipropylammonium tetrachloroaluminate, N - methylpyridinium tetrachloroaluminate, N-methylpyridinium tetrachloroaluminate, trimethyl cyclohexylammonium tetrachloroaluminate, and N-propylpyridinium tetrachloroaluminate. It is generally desirable to avoid phenyl substituted salts since these would deactivate the aluminum chloride, and it is also generally desirable to maintain alkyl substituents of less than about five carbon atoms, since longer chain alkyl groups tend to crack and deactivate the catalyst.

The further addition of antimony choride to the organic salt mixture enhances the melting point reduction of the catalyst salts to a still greater degree. The amount of antimony chloride used may vary substantially; it is advantageous in even smaller amounts, such as ½% wt., since it additionally acts as a corrosion inhibitor, but is preferably used to the extent of at least 10% wt. to have beneficial effects as a melting-point depressant. Amounts of 15–40% are preferred. It may be used in amounts up to about 50–70% wt. In addition, the antimony chloride seems to have a supplementary advantage of enhancing the catalytic activity of the dissolved aluminum chloride. Some examples of the low-melting organic salts are shown in the following Table 1.

TABLE 1.—LOW-MELTING ORGANIC SALT MIXTURES

|  | A | B | C | D |
|---|---|---|---|---|
| Components, percent wt.: |  |  |  |  |
| $SbCl_3$ | 46.1 | 66.0 |  | 42.7 |
| Tetramethylammonium tetrachloroaluminate | 35.0 | 24.0 |  |  |
| Tetraethylammonium tetrachloroaluminate |  |  |  | 38.4 |
| N-methylpyridinium tetrachloroaluminate |  |  | 66.27 |  |
| $AlCl_3$ | 18.9 | 10.0 | 33.73 | 18.9 |
| Freezing point, °C | 10 | 19 | 8 | <0 |

The organic salt mixtures have the advantage of being lower melting than the inorganic salt mixtures, thereby providing practical operation at about room temperature. Low-temperature hydrocarbon conversions are often very desirable since better isomer distribution, for example higher iso/normal ratios, can be achieved because of more favorable equilibrium. In addition, low-temperature operations generally have fewer side reactions, such as disproportionation and cracking, and do not require external heating. Even if operating temperatures above room temperature are desired, lower melting catalysts would still be preferred for convenience of operation, e.g., it would not be necessary to steam-trace lines containing catalyst.

As discussed above, known solvents for aluminum chloride generally depress the activity of the aluminum chloride by complex formation and therefore are not desirable as catalyst constituents. The catalysts of the invention, however, retain a very high activity for hydrocarbon conversion, as is shown in the following examples.

EXAMPLE I

A catalyst mixture consisting of 46.1% antimony chloride, 35.0% tetramethylammonium tetrachloroaluminate, and 18.9% wt. aluminum chloride, having a freezing point of 10° C., was determined by its use for isomerization of n-hexane. The results, shown in Table 2 below, indicate that this catalyst has a high activity for paraffin isomerization. In the experiment, 33 grams of n-hexane were reacted in the presence of 100 grams of catalyst and 8 grams of HCl for one hour at a temperature of 24° C.

TABLE 2.—ISOMERIZATION OF n-HEXANE

| Products: | Grams |
|---|---|
| $C_3H_8$ | 0.02 |
| $i$-$C_4H_{10}$ | 3.6 |
| $n$-$C_4H_{10}$ | 0.1 |
| $i$-$C_5H_{12}$ | 1.7 |
| $n$-$C_5H_{12}$ | 0.2 |
| 2,2-dimethylbutane | 6.4 |
| 2-methylpentane, 2,3-dimethylbutane | 11 |
| 3-methylpentane | 3.0 |
| $n$-$C_6H_{14}$ | 5.6 |
| $C_7$–$C_{12}$ | 0.7 |
| Total | 32.3 |

| | Percent wt. |
|---|---|
| Isomerization | 62.4 |
| Cracking product | 17.1 |
| Unconverted $n$-$C_6$ | 16.9 |
| $C_7^+$ products | 2.2 |
| Sludge | 1.2 |

Similar results were obtained from hexane isomerization with a catalyst consisting of 66.3% N-methylpyridinium tetrachloroaluminate and 33.7% free aluminum chloride, freezing at 8° C.

EXAMPLE II

To further illustrate the remarkable activities of the liquid salt mixtures, a catalytic activity of a mixture of the invention was compared with that of an aluminum chloride slurry for the cracking of n-octane. In the experiment according to the invention, the catalyst was a mixture of about 80% N-methylpyridinium tetrachloroaluminate and about 20% aluminum chloride. Octane was reacted with this catalyst for one-half hour at a temperature of 24° C. The comparative experiment was run for two hours at a much higher temperature, 100° C., using slurried aluminum chloride. The results, shown in Table 3 below, surprisingly indicate that the cracking activity of the liquid catalyst is higher than that of the solid catalyst, even though a much lower temperature was used.

TABLE 3.—CRACKING OF n-OCTANE

|  | Liquid catalyst | Slurry catalyst |
|---|---|---|
| Temperature, °C | 24 | 100 |
| Reaction time, hr | 0.5 | 2.0 |
| $H_2$ pressure, p.s.i.g | 120 | 600 |
| Feed, grams: |  |  |
| $(C_5H_5N)CH_3^{\oplus}AlCl_4^{\ominus}$ | 79.1 |  |
| $AlCl_3$ | 20.9 | 5.3 |
| HCl | 8.5 | 1.5 |
| n-Octane | 70.4 | 70.4 |
| Products, grams: |  |  |
| $C_3H_8$ | 0.03 | 0.3 |
| $i$-$C_4H_{10}$ | 17.5 | 8.2 |
| $n$-$C_4H_{10}$ | 0.9 | 1.3 |
| $i$-$C_5H_{12}$ | 5.6 | 7.6 |
| $n$-$C_5H_{12}$ | 1.1 | 1.0 |
| 2,2-dimethylbutane | 2.9 | 0.5 |
| 2-methylpentane and 2,3-dimethylbutane | 2.4 | 5.7 |
| 3-methylpentane | 0.8 |  |
| $n$-$C_6H_{14}$ | 0.3 |  |
| $C_7H_{16}$ | 5.2 | 3.5 |
| $i$-$C_8H_{18}$ | 1.5 | 3.9 |
| $n$-$C_8H_{18}$ | 15.1 | 37.4 |
| $C_9$–$C_{12}$ | 4.7 |  |
| Cracking, percent wt | 52.2 | 39.9 |
| Isomerization, percent wt | 2.1 | 5.5 |
| Unconverted $C_8$, percent wt | 21.4 | 53.2 |
| $C_9^+$ products, percent wt | 6.6 |  |
| Sludge, percent wt | 17.7 |  |

Other examples of organic low-melting aluminum chloride catalysts of the invention are as follows:

I

| Component: | Percent wt. |
|---|---|
| $(CH_3)_4N^+AlCl_4^-$ | 20 |
| $AlCl_3$ | 20 |
| $SbCl_3$ | 60 |

II

| | |
|---|---|
| $(CH_3)_2(C_2H_5)_2N^+AlCl_4^-$ | 65 |
| $AlCl_3$ | 35 |

III

| | |
|---|---|
| $(C_5H_5N)(CH_3)^+AlCl_4^-$ | 15 |
| $AlCl_3$ | 25 |
| $SbCl_3$ | 60 |

IV

| | |
|---|---|
| $(C_2H_5)_2(C_4H_9)_2N^+AlCl_4^-$ | 75 |
| $AlCl_3$ | 20 |
| $SbCl_3$ | 5 |

V

| | |
|---|---|
| $(C_5H_5N)(C_3H_7)N^+AlCl_4^-$ | 60 |
| $AlCl_3$ | 40 |

INORGANIC SALT MIXTURES

The inorganic catalyst mixtures of the invention also have the advantage of having low melting points, although they are not as low melting as the organic mixtures. In addition, the inorganic catalysts have a very high activity and have the further advantage of being easily regenerated. Inorganic catalysts of the invention comprise at least 5% wt. and preferably at least 8% wt. free aluminum chloride to impart activity to the catalyst, with a maximum amount of aluminum chloride being determined generally by the desired catalyst activity and the amount of aluminum chloride soluble in the solvent. Upper limits are generally less than 50% and usually less than 30% wt. aluminum chloride. In addition to aluminum chloride, the catalysts comprise (1) at least two alkali metal tetrachloroaluminates in an amount of at least 2% wt. of each, having a total of from about 4–60% wt., and (2) 1–50% wt., preferably 10–40% wt., of at least one, preferably one or two, tetrachloroaluminates selected from the group consisting of calcium, barium, and zinc. Similarly to the case of organic salts, the inorganic catalyst mixtures may also contain from 0–70% wt. antimony chloride. In general, other salts tried in place of the calcium, barium, and zinc tetrachloroaluminates were ineffective to reduce the melting point of the alkali metal aluminum chloride mixture. Examples of ineffective salts are copper, thallium, cadmium, mercury, lead, magnesium, thorium, cobalt, nickel, tin, chromium, iron, and lanthanum tetrachloroaluminates. In general, inorganic catalysts of the invention freeze at temperatures of from about 30–60° C. Suitable alkali metal tetrachloroaluminates are lithium, sodium, and potassium tetrachloroaluminates. At least two and preferably all three should be present to achieve low-melting mixtures. The appropriate alkali metal chlorides may be added to an $AlCl_3$-containing solution, and corresponding tetrahaloaluminates will be formed in situ.

To illustrate the desirability of adding divalent salts to the alkali metal tetrachloroaluminate, various salts were added to a basic mixture which consisted of lithium, sodium and potassium tetrachloroaluminates in amount of 23.5, 33.3, and 17.0% wt., respectively, and 26.2% wt. free aluminum chloride. The basic mixture had a freezing point of 73° C. The addition of from about 2–4% wt. of calcuim chloride, zinc chloride, or barium chloride lowered the melting point by about 10° C. However, addition of similar amounts of the various other salts listed above was ineffective to reduce the melting point and in many cases increased the freezing point by a substantial amount. The addition of zinc, calcium and barium chlorides to the above mixture in amounts from about 2–15% wt. decreased the freezing point of the mixture to between about 45–60° C. Addition of the various metal chloride salts to an aluminum chloride-containing solution results in tetrachloroaluminate formation in situ; although it has been postulated in the literature that some metals, such as zinc, actually do not form tetrachloroaluminates, all metals considered herein are assumed to form tetrachloroaluminates for consistency of discussion. Whether or not tetrachloroaluminates are in fact formed is not important to the invention. Examples of some specific catalysts in accordance with the invention are shown in Table 4 below.

TABLE 4.—ALKALI CHLORIDE-$ZnCl_2$-$AlCl_3$ SALT MIXTURES

| Components, grams: | | | |
|---|---|---|---|
| LiCl | 1.15 | 1.9 | 1.28 |
| NaCl | 2.07 | 2.29 | 1.91 |
| KCl | 1.24 | 1.60 | 1.32 |
| $ZnCl_2$ | 3.24 | 2.74 | 2.88 |
| $AlCl_3$ | 22.3 | 22.2 | 22.6 |
| Freezing point, °C.: | | | |
| First solid | 49 | 53 | 49 |
| Formation of most solid | 45 | 43 |  |

Use of the barium and calcium salts give similar results. Substantial decreases in melting points may also be achieved by adding more than one of the group of calcium, barium and zinc.

Similarly to the organic salt system, the addition of substantial amounts of antimony trichloride also has very beneficial effects on the melting point reduction of the inorganic salts. Amounts of antimony chloride used may be from 0–70% wt., with maximum benefits on reduction of melting point occurring between about 20–40% wt. antimony chloride. The addition of from 10–40% wt. antimony chloride to a mixture consisting of lithium, sodium, and potassium tetrachloroaluminates, some free aluminum chloride, and from about 12% wt. zinc chloride lowered the melting point to between 30 to 40° C., thereby providing a catalyst which freezes at only very slightly above room temperature.

The following examples illustrate the activity and regenerability of an inorganic catalyst of the invention.

EXAMPLE III n-Hexane was isomerized with a catalyst comprising 18% free $AlCl_3$ in a basic salt mixture consisting of about 16% wt. $LiAlCl_4$, 23% $NaAlCl_4$, 11% $KAlCl_4$, 32% $Zn(AlCl_4)_2$, and 18% $AlCl_2$. The hydrocarbon reaction mixture was 190 ml. n-hexane, 10 ml. methylcyclopentane, with a 0.1 ml. benzene, also containing 2.5 grams HCl. The reaction was carried out under a 200 p.s.i.g. hydrogen pressure. The catalyst mixture melted at about 47° C. The results of the isomerization are shown in Table 5 below.

TABLE 5.—ISOMERIZATION OF n-HEXANE

| Time, hr | 1 | 1 | 4 |
|---|---|---|---|
| Temperature, °C. | 85 | 85 | 50 |
| Catalyst, grams: | | | |
| "Free" $AlCl_3$ | 18 | 18 | 18 |
| $SbCl_3$ | | 20 | 26.2 |
| Salt mixture [1] | 105 | 105 | 105 |
| Product, relative weights: | | | |
| $C_3$-$C_5$ | | 1.8 | 0.2 |
| 2,2-dimethylbutane | 25.3 | 36.7 | 25.0 |
| 2,3-dimethylbutane+2-methylpentane | 30.4 | 35.6 | 34.4 |
| 3-methylpentane | 10.9 | 12.8 | 11.3 |
| n-$C_6H_{14}$ | 25.3 | 8.5 | 19.1 |
| Cyclic $C_6$ recovered, percent | 66 | 50 | 97 |
| Conversion of n-$C_6H_{14}$, percent | 72 | 90.5 | 78.6 |
| Equilibrium conversion, percent | 91.7 | 91.7 | 94.5 |
| Equilibrium obtained, percent | 78.5 | 98.7 | 83.2 |
| Half-Lives completed | 2.3 | 6.3 | 2.6 |

[1] 16% wt. $LiAlCl_4$, 23% wt. $NaAlCl_4$, 11% wt. $KAlCl_4$, 32% wt. $Zn(AlCl_4)$.

These experiments show that the aluminum chloride has retained its activity in the inorganic salt mixtures.

Additional experiments also indicated that the low-melting salt mixtures have activities approximately the same as active aluminum chloride for ethylene-isobutane alkylation.

EXAMPLE IV

In order to demonstrate catalyst regenerability, sludged catalyst from a pentane isomerization experiment using a catalyst of Example III above was hydrogenated for one hour at 200° C. in the presence of 1200 p.s.i.g. hydrogen. At the end of the regeneration, only 3% of the sludge hydrocarbon remained in the catalyst, and therefore the regeneration of the catalyst was about 97% complete.

Further examples of inorganic catalysts of the invention are as follows:

Component:                                      Percent wt.

I $LiAlCl_4$ _____ 30
$NaAlCl_4$ _____ 30
$Ca(AlCl_4)_2$ _____ 5
$AlCl_3$ _____ 35

II $LiAlCl_4$ _____ 20
$NaAlCl_4$ _____ 10
$KAlCl_4$ _____ 30
$Zn(AlCl_4)_2$ _____ 10
$AlCl_3$ _____ 30

III $NaAlCl_4$ _____ 25
$KAlCl_4$ _____ 5
$Ba(AlCl_4)_2$ _____ 12
$AlCl_3$ _____ 20
$SbCl_3$ _____ 38

IV $LiAlCl_4$ _____ 20
$NaAlCl_4$ _____ 20
$KAlCl_4$ _____ 20
$Ba(AlCl_4)_2$ _____ 10
$Ca(AlCl_4)_2$ _____ 5
$AlCl_3$ _____ 25

V $LiAlCl_4$ _____ 10
$KAlCl_4$ _____ 5
$NaAlCl_4$ _____ 10
$Zi(AlCl_4)_2$ _____ 5
$Ba(AlCl_4)_2$ _____ 2
$AlCl_3$ _____ 10
$SbCl_3$ _____ 58

VI

| Component: | Percent wt. |
|---|---|
| LiAlCl$_4$ | 15 |
| NaAlCl$_4$ | 30 |
| KAlCl$_4$ | 5 |
| Zn(AlCl$_4$)$_3$ | 20 |
| Ca(AlCl$_4$)$_2$ | 20 |
| AlCl$_3$ | 10 |

VII

| | |
|---|---|
| LiAlCl$_4$ | 10 |
| NaAlCl$_4$ | 20 |
| KAlCl$_4$ | 5 |
| Zn(AlCl$_4$)$_2$ | 15 |
| Ca(AlCl$_4$)$_2$ | 15 |
| AlCl$_3$ | 15 |
| SbCl$_3$ | 20 |

VIII

| | |
|---|---|
| LiAlCl$_4$ | 15 |
| NaAlCl$_4$ | 15 |
| KAlCl$_4$ | 10 |
| Zn(AlCl$_4$)$_2$ | 20 |
| AlCl$_3$ | 10 |
| SbCl$_3$ | 30 |

I claim as my invention:

1. A low-melting Friedel-Crafts catalyst having the composition
   (1) 5–50% wt. aluminum chloride
   (2) 0–70% wt. antimony chloride, and
   (3) 5–80% wt. of a C$_4$–C$_{20}$ quaternary ammonium tetrachloroaluminate.

2. A catalyst according to claim 1 which contains 15–40% wt. antimony chloride and 5–80% wt. of a C$_4$–C$_{10}$ quaternary ammonium tetrachloroaluminate.

References Cited

UNITED STATES PATENTS

| | | | |
|---|---|---|---|
| 2,328,275 | 8/1943 | Heard | 260—663 |
| 2,379,687 | 7/1945 | Crawford | 252—199 |
| 2,393,569 | 1/1946 | Ross | 260—683.5 |
| 2,394,752 | 2/1946 | Crawford | 260—683.5 |

DANIEL E. WYMAN, Primary Examiner

PHILIP M. FRENCH, Assistant Examiner

U.S. Cl. X.R.

252—442